United States Patent
Kuroda

(10) Patent No.: US 7,944,635 B2
(45) Date of Patent: May 17, 2011

(54) LENS BARREL AND IMAGE PICKUP APPARATUS

(75) Inventor: Daisuke Kuroda, Kanagawa (JP)

(73) Assignee: Sony Corporation, Tokyo (JP)

( * ) Notice: Subject to any disclaimer, the term of this patent is extended or adjusted under 35 U.S.C. 154(b) by 140 days.

(21) Appl. No.: 12/216,083

(22) Filed: Jun. 30, 2008

(65) Prior Publication Data
US 2009/0046382 A1 Feb. 19, 2009

(30) Foreign Application Priority Data
Aug. 17, 2007 (JP) ................................. 2007-212772

(51) Int. Cl.
*G02B 7/02* (2006.01)
(52) U.S. Cl. ...................................................... 359/823
(58) Field of Classification Search ........... 359/819–825
See application file for complete search history.

(56) References Cited

U.S. PATENT DOCUMENTS

| | | | | |
|---|---|---|---|---|
| 5,241,421 A * | 8/1993 | Endo et al. | ...................... | 359/684 |
| 5,408,285 A * | 4/1995 | Azegami et al. | .............. | 396/349 |
| 5,594,517 A * | 1/1997 | Tsunefuji | ......................... | 396/87 |
| 6,654,187 B2 * | 11/2003 | Ning | .............................. | 359/823 |
| 7,215,483 B2 * | 5/2007 | Sekita | ........................... | 359/682 |
| 7,254,322 B2 * | 8/2007 | Kusaka | ........................... | 396/79 |
| 7,468,753 B2 * | 12/2008 | Butterworth et al. | ......... | 348/357 |

FOREIGN PATENT DOCUMENTS

| | | |
|---|---|---|
| JP | 11-133291 | 5/1999 |
| JP | 2002-303776 | 10/2002 |
| JP | 2004-085603 | 3/2004 |
| WO | WO-2004/107007 | 12/2004 |

OTHER PUBLICATIONS

Japanese Office Action issued Apr. 9, 2009 for corresponding Japanese Application No. 2007-212772.

* cited by examiner

*Primary Examiner* — Ricky L Mack
*Assistant Examiner* — Vipin M Patel
(74) *Attorney, Agent, or Firm* — Rader, Fishman & Grauer PLLC

(57) ABSTRACT

A lens barrel includes a shooting optical system contained in a barrel and operable to lead a subject image to an image sensor, a back focus adjustment lens group constituting a part of the shooting optical system and operable to be fixed immovably after the position of the back focus adjustment lens group is adjusted in an optical axis direction of the shooting optical system, and a back focus adjustment mechanism operable to adjust the position of the back focus adjustment lens group in the optical axis direction.

11 Claims, 10 Drawing Sheets

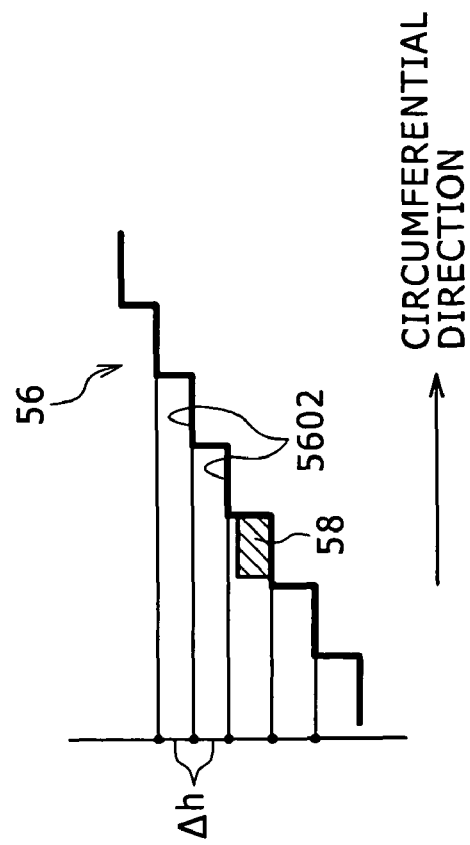
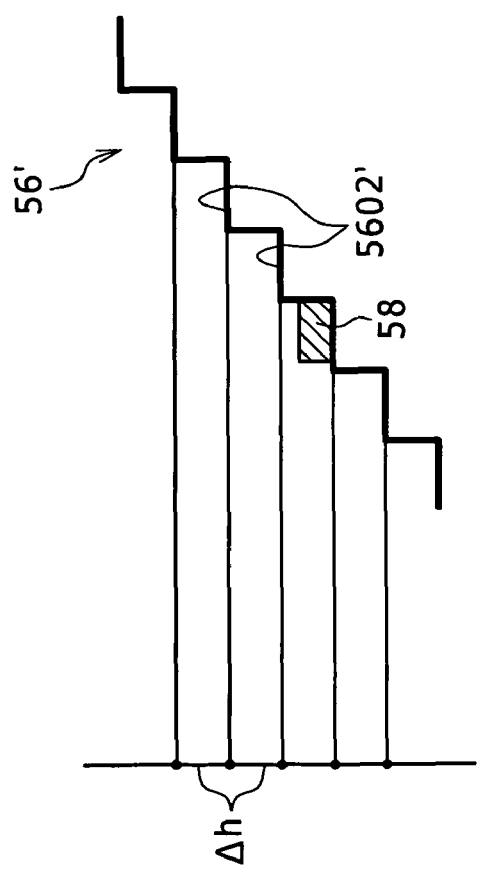

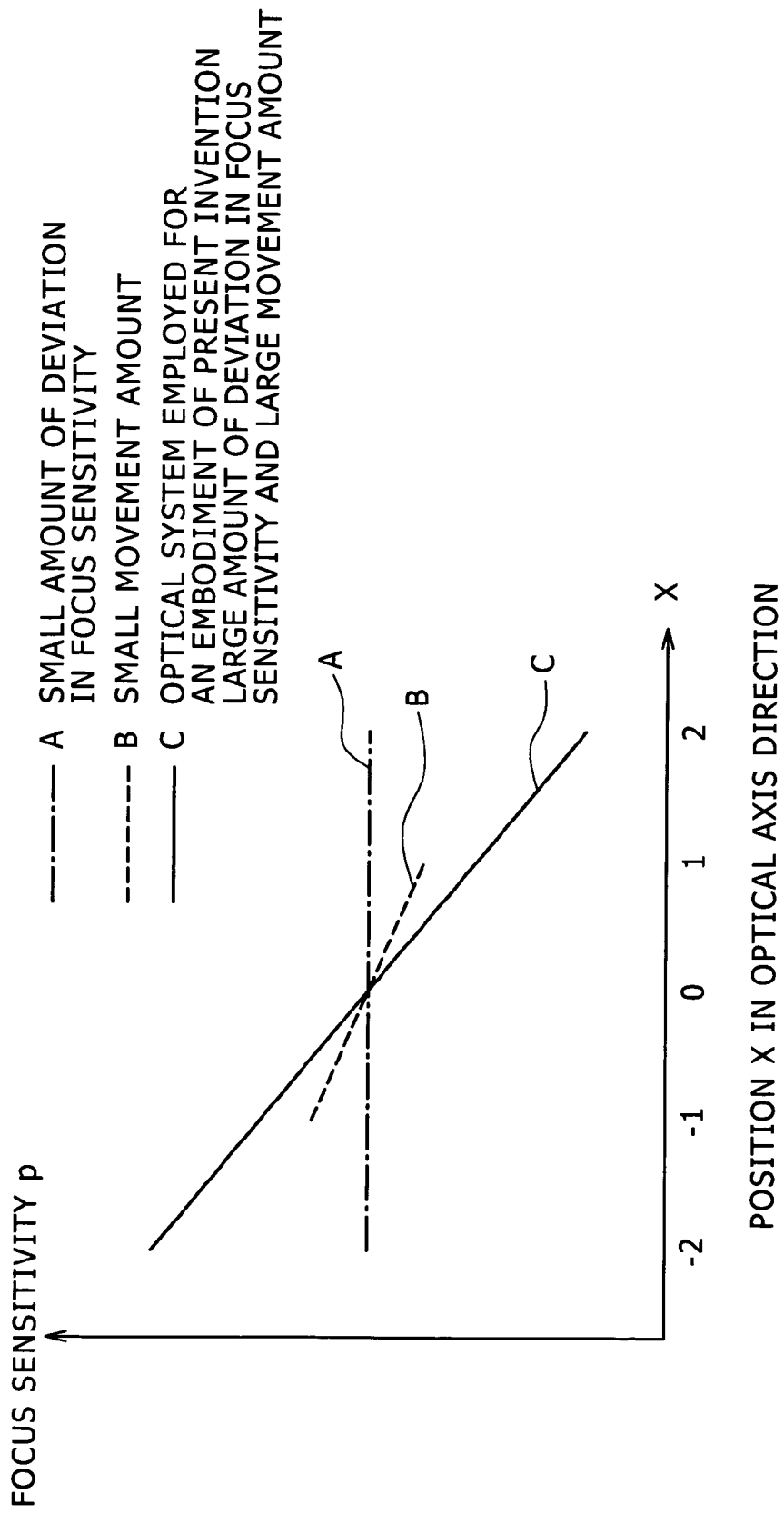

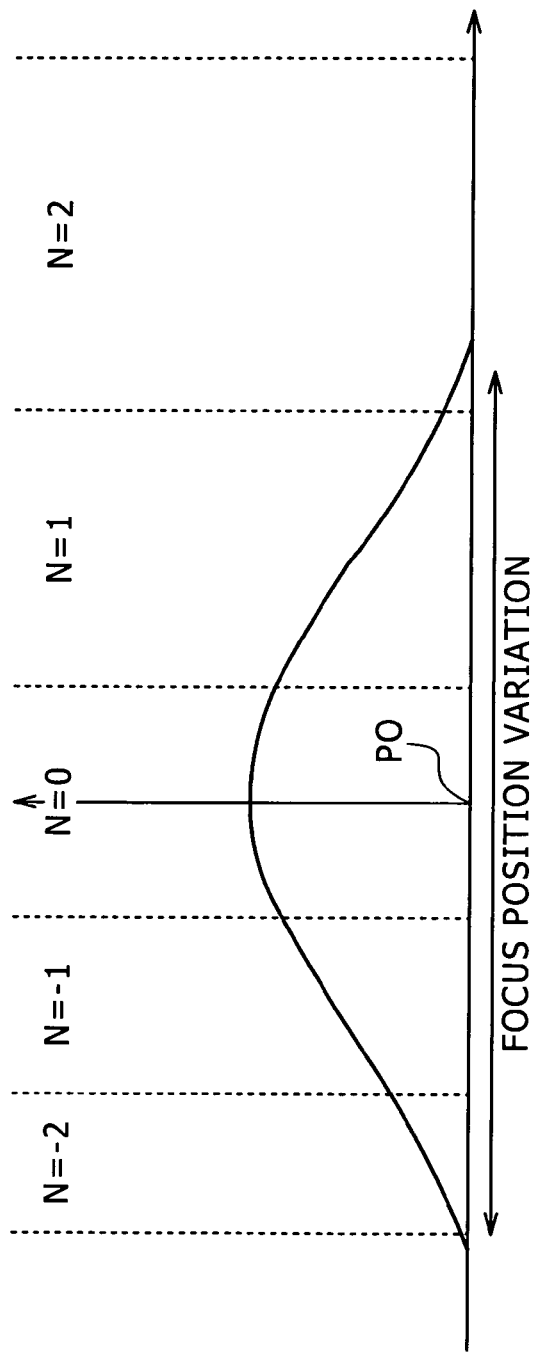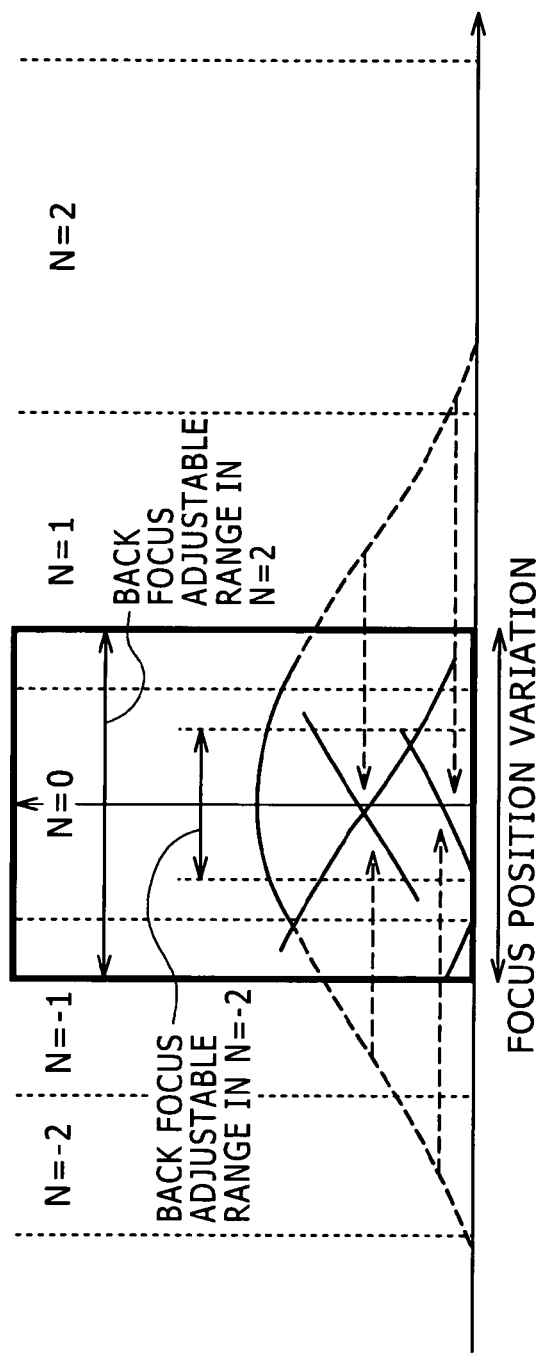

LENS BARREL AND IMAGE PICKUP APPARATUS

CROSS REFERENCES TO RELATED APPLICATIONS

The present invention contains subject matter related to Japanese Patent application JP 2007-212772 filed in the Japanese Patent Office on Aug. 17, 2007, the entire contents of which are incorporated herein by reference.

BACKGROUND OF THE INVENTION

1. Field of the Invention

The present invention relates to a lens barrel and an image pickup apparatus.

2. Description of the Related Art

Image pickup apparatuses, such as a digital still camera and a video camera, are provided with a lens barrel containing a shooting optical system which leads a subject image to an image sensor.

Such a lens barrel is designed so that a focus position (a back focus position or a focusing position) of the shooting optical system for the distance of a certain subject may become a predetermined design value (in other words, the position of an image surface of the subject image formed by the shooting optical system may become the predetermined design value). However, in the lens barrel actually manufactured, there is a manufacturing error induced at the time of manufacturing a lens constituting the shooting optical system or a lens-holding mechanical component, or an assembly error induced at the time of assembling the lens and the mechanical component. Therefore, the aforementioned focus position exhibits a variation centering on the design value.

On the other hand, since the focusing of the subject image formed on an image sensor is performed by moving a focus lens (focusing group) which constitutes the shooting optical system, it is possible to absorb the variation of the focus position by the focusing group when the focus lens can move to and fro in the optical axis direction with a full amount of margin. However, when the amount of variation of the focus position is very large, or when the amount of margin before and behind the focusing group is insufficient, it is necessary to adjust the back focus position (to adjust a back focus amount) in some parts other than the focusing group in the manufacturing stage.

Adjustment methods of such a back focus amount include the method of moving an image sensor (image pickup plane) in the optical axis direction and the method of moving some lenses which constitute the shooting optical system in the optical axis direction as a back focus adjustment lens.

As a structure of moving an image sensor and a back focus adjustment lens in the optical axis direction, there is proposed a structure in which, for example, several step-wise engagement surfaces having different heights in the optical axis direction are formed in the barrel, and these engagement surfaces are selectively used to determine the position of the back focus adjustment lens in the optical axis direction (refer to JP-2002-303776 A).

SUMMARY OF THE INVENTION

In recent years, with the request for further miniaturization and high magnification to a lens barrel, a lens with a high refractive power is employed as a back focus adjustment lens.

When the ratio of the movement amount of a focus position in a shooting optical system to the movement amount of a back focus adjustment lens in the optical axis direction is defined as focus sensitivity, the focus sensitivity in the shooting optical system including the back focus adjustment lens with such a high refractive power tends to change greatly depending on the position of the back focus adjustment lens in the optical axis direction.

Consequently, when the focus sensitivity is low, the movement amount of the focus position in the shooting optical system is small relative to the movement amount of the back focus adjustment lens; conversely, when the focus sensitivity is high, the movement amount of the focus position in the shooting optical system is large relative to the movement amount of the back focus adjustment lens.

However, in the above-described technology in which the position of the back focus adjustment lens is determined in the optical axis direction with the selective use of plural engagement surfaces, the difference of height of the adjacent engagement surfaces is assumed to be the same; therefore, the movement amount of the back focus adjustment lens is mostly the same, irrespectively to the focus sensitivity.

Consequently, the shooting optical system of which the focus sensitivity changes greatly depending on the position of a back focus adjustment lens in the optical axis direction has the disadvantage in performing the back focus adjustment appropriately.

The present invention is made in view of the above circumstances and provides a lens barrel and an image pickup apparatus which are advantageous in performing the back focus adjustment appropriately and efficiently.

In view of the above circumstances, one embodiment of the present invention provides a lens barrel including: a shooting optical system contained in a barrel and operable to lead a subject image to an image sensor; a back focus adjustment lens group constituting a part of the shooting optical system and operable so as to be fixed immovably after the position of the back focus adjustment lens group is adjusted in an optical axis direction of the shooting optical system; and a back focus adjustment mechanism operable to adjust the position of the back focus adjustment lens group in the optical axis direction. The back focus adjustment mechanism of the lens barrel includes a barrel engagement member possessing plural engagement surfaces arranged in the barrel in a circumferential direction centering on the optical axis, each of the plural engagement surfaces possessing a different height in a direction parallel with the optical axis, and a lens engagement member arranged in a lens holding frame which holds the back focus adjustment lens group, the lens engagement member being operable so as to be selectively engaged with the engagement surfaces. The back focus adjustment lens group of the lens barrel is adjusted in position in the optical axis direction by changing the engagement surfaces with which the lens engagement member is engaged. The adjoining engagement surfaces of the back focus adjustment mechanism are formed to possess one of an increasing difference in height and a decreasing difference in height along the circumferential direction.

Another embodiment of the present invention provides an image pickup apparatus possessing a lens barrel which includes: a shooting optical system contained in a barrel and operable to lead a subject image to an image sensor; a back focus adjustment lens group constituting a part of the shooting optical system and operable so as to be fixed immovably after the position of the back focus adjustment lens group is adjusted in an optical axis direction of the shooting optical system; and a back focus adjustment mechanism operable to adjust the position of the back focus adjustment lens group in the optical axis direction. The back focus adjustment mechanism of the lens barrel includes a barrel engagement member possessing plural engagement surfaces arranged in the barrel in a circumferential direction centering on the optical axis, each of the plural engagement surfaces possessing a different height in a direction parallel with the optical axis, and a lens engagement member arranged in a lens holding frame which holds the back focus adjustment lens group, the lens engagement member being operable so as to be selectively engaged with the engagement surfaces. The back focus adjustment lens group of the barrel is adjusted in position in the optical axis direction by changing the engagement surfaces with which the lens engagement member is engaged. The adjoining engagement surfaces of the back focus adjustment mechanism are formed to possess one of an increasing difference in height and a decreasing difference in height along the circumferential direction.

According to one embodiment of the present invention, by forming the plural engagement surfaces of the barrel engagement member so that one of the difference of height of the adjacent engagement surfaces may increase or decrease along the circumferential direction, the difference of height is set up so that the back focus adjustment amount may become almost the same even when the back focus adjustment lens group is moved by any one of the differences of height. Consequently, advantageous effects can be enjoyed by the present invention in performing the back focus adjustment appropriately and efficiently with suppressed uselessness of the back focus adjustable range.

BRIEF DESCRIPTION OF THE DRAWINGS

FIG. 6A is an explanatory view illustrating an engagement surface 5602 of a barrel engagement member 56;

FIG. 6B is an explanatory view illustrating an engagement surface in a comparative example;

FIG. 7 is an explanatory chart illustrating the relationship between the position X of the back focus adjustment lens group in the optical axis direction and the focus sensitivity p of the back focus adjustment lens group in the shooting optical system;

FIG. 9A is a schematic diagram illustrating the variation in the focus position (back focus) generated at the time of manufacture of a lens barrel, when the refractive power of each lens group is high;

FIG. 9B is a schematic diagram illustrating the span of adjustable range after a back focus adjustment is practiced.

DETAILED DESCRIPTION OF THE INVENTION

One embodiment of the present invention is described with reference to the accompanying drawings.

Figure 1:
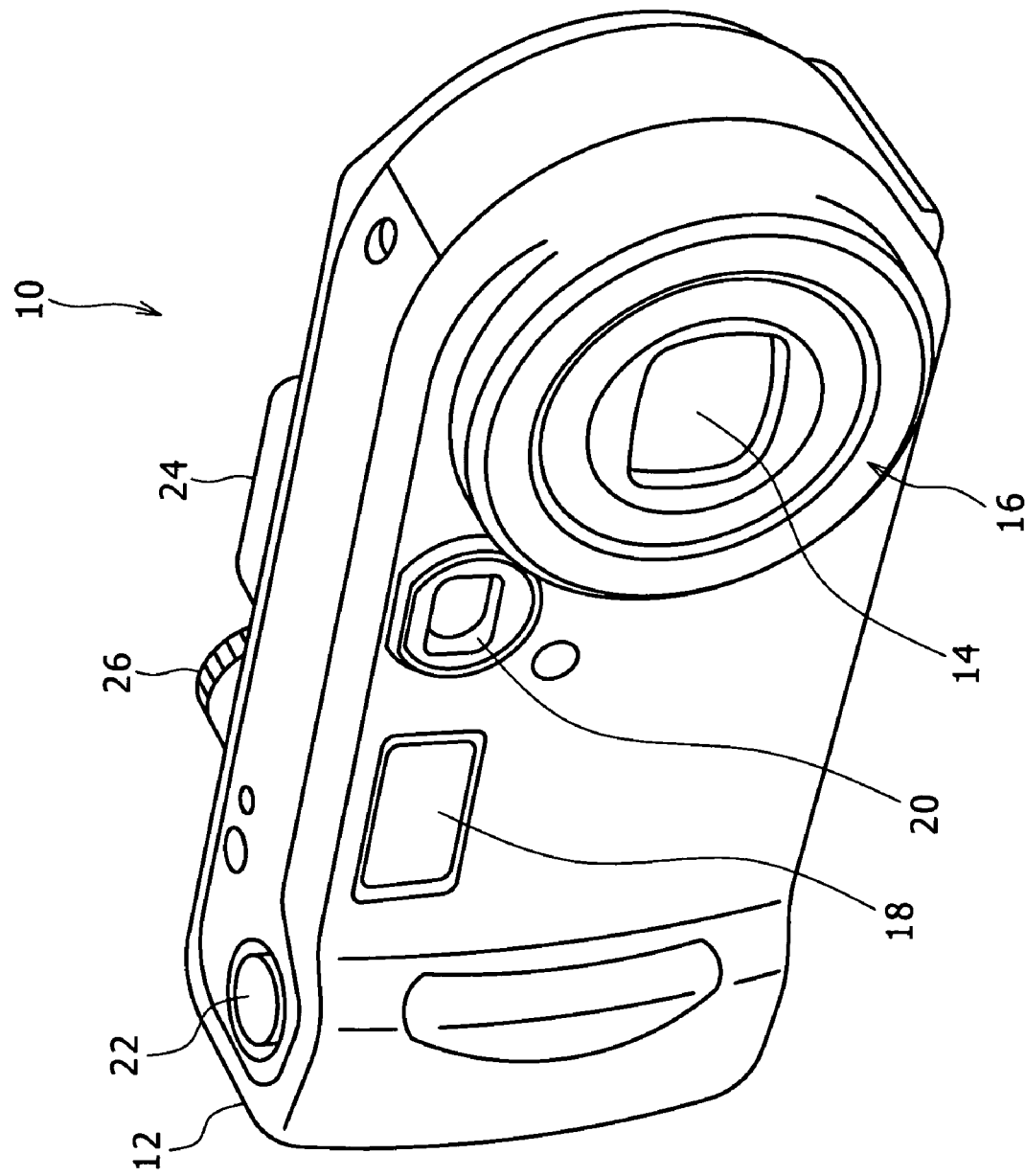
FIG. 1 is a perspective view illustrating an image pickup apparatus according to one embodiment of the present invention.
Figure 2:
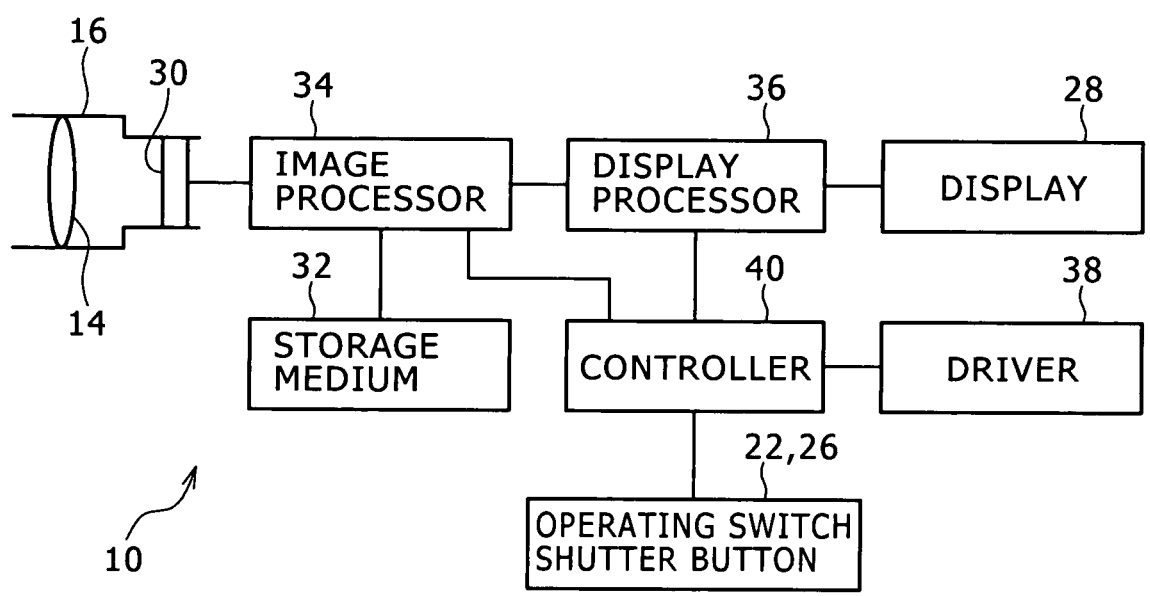
FIG. 2 is a block diagram illustrating the structure of the image pickup apparatus according to the embodiment.

FIG. 1 is a perspective view illustrating an image pickup apparatus according to the present embodiment. FIG. 2 is a block diagram illustrating the structure of the image pickup apparatus of the present embodiment.

As illustrated in FIG. 1, an image pickup apparatus 10 of the present embodiment is a digital still camera, and it possesses a case 12 which constitutes the exterior of the camera body. It is assumed in the present specification that the subject side is the front and the opposite side is the back.

A lens barrel 16 which includes a shooting optical system 14 is provided in the front right side of the case 12. An image sensor 30 (FIG. 2) which pictures a subject image led by the shooting optical system 14 is provided in the back end of the lens barrel 16.

A flash unit 18 which emits a flashlight, an objective lens 20 of an optical viewfinder, etc. are provided in the front top of the case 12. In the present specification, it is assumed that the front means the subject side and that the back means the image formation side.

A shutter button 22 is provided in the upper end surface of the case 12. An eyepiece window 24 of the optical viewfinder, plural operating switches 26 for performing various operations, such as power-on/off, switching of a shooting mode and a replay mode, a display 28 (FIG. 2) which displays the picturized image, etc. are provided in the rear surface of the case 12.

As shown in FIG. 2, the image pickup apparatus 10 has the image sensor 30, a storage medium 32, an image processor 34, a display processor 36, a driver 38, a controller 40, etc. The image sensor 30 possesses an image pickup plane 30A (FIG. 3) and is composed of a CCD sensor, a CMOS sensor, or the like, which are able to picture a subject image formed on an image pickup plane 30A by the shooting optical system 14 and generate an image signal.

The image processor 34 generates image data based on the image signal outputted from the image sensor 30, and records the image data on the storage medium 32.

The storage medium 32 is composed of a memory card inserted in a removable manner in a memory slot provided in the camera body 12, or a memory built in the camera body 12.

The display processor 36 displays the image data supplied from the image processor 34 on a display 28.

The driver 38 moves a focus lens (refer to FIG. 3) mentioned later in the optical axis direction.

The controller 40 is composed of CPU, etc. which control the image processor 34, the display processor 36, and the driver 38 according to the operation of an operating switch 26 or a shutter button 22.

Next, an outline of the structure of the lens barrel 16 is explained.

Figure 3:
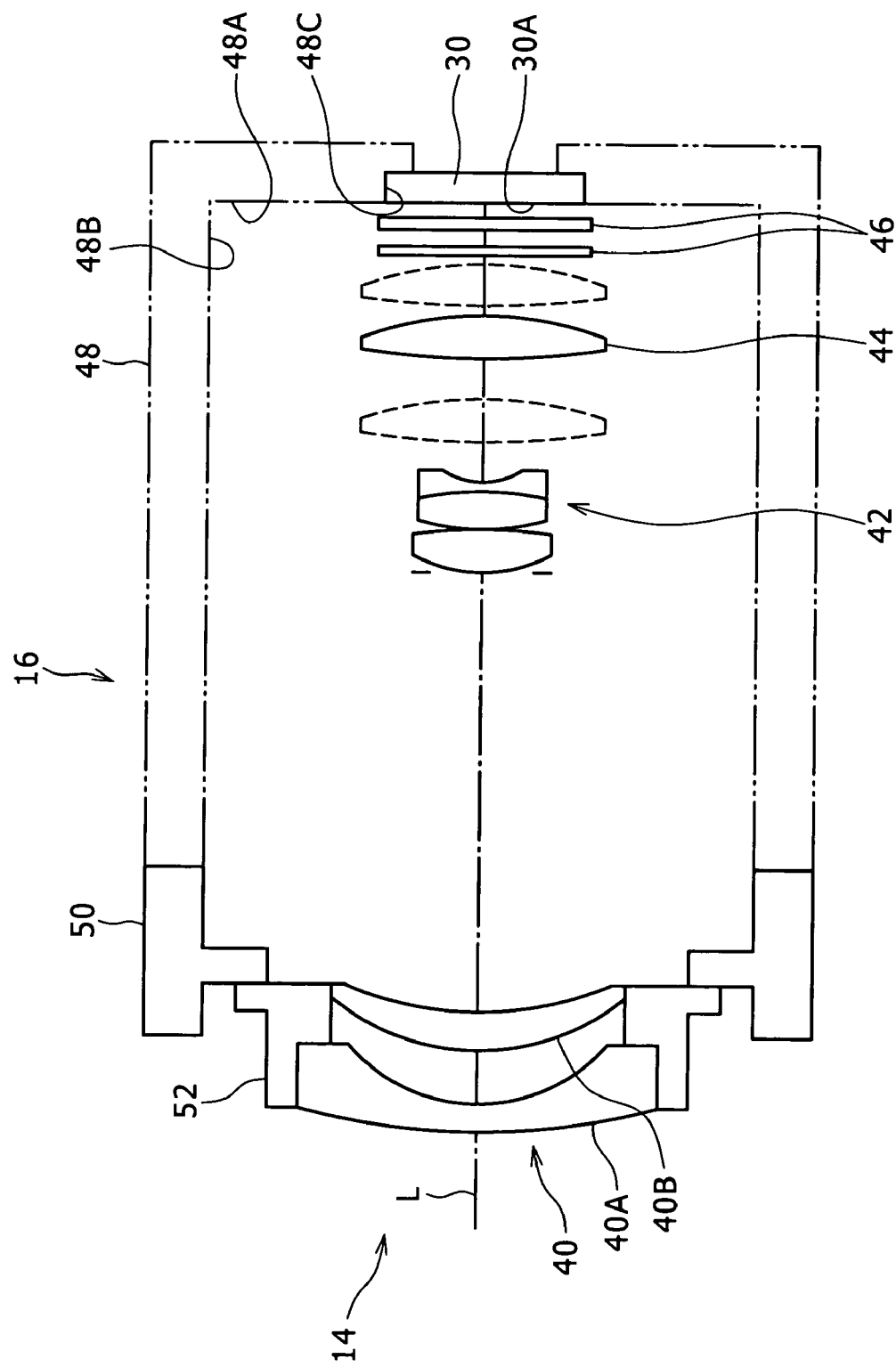
FIG. 3 is an explanatory view illustrating the outline of structure of a lens barrel 16.

FIG. 3 is an explanatory view illustrating the outline of the structure of the lens barrel 16.

As shown in FIG. 3, the shooting optical system 14 of the present embodiment has a back focus adjustment lens group 40, an intermediate lens group 42, and a focus lens group 44.

According to the present embodiment, the back focus adjustment lens group 40 possesses a negative refractive power, the intermediate lens group 42 possesses a positive refractive power, and the focus lens group 44 possesses a positive refractive power.

The lens barrel 16 possesses a first barrel 48 and a second barrel 50.

The first barrel 48 is formed with a circular cross section. The first barrel 48 possesses a back wall 48A with a central opening 48C and a peripheral wall 48B which stands up ahead from the outer circumference of the back wall 48A.

The second barrel 50 is attached at the front end of the peripheral wall 48B, and accommodates the back focus adjustment lens group 40.

The back focus adjustment lens group 40 of the present embodiment is composed of two lenses of a first lens 40A and a second lens 40B located in the back of the first lens 40A. The first lens 40A and the second lens 40B are held by an annular lens holding frame 52 that is attached to the second barrel 50. The way of attaching the lens holding frame 52 to the second barrel 50 is explained in detail later.

Figure 5:
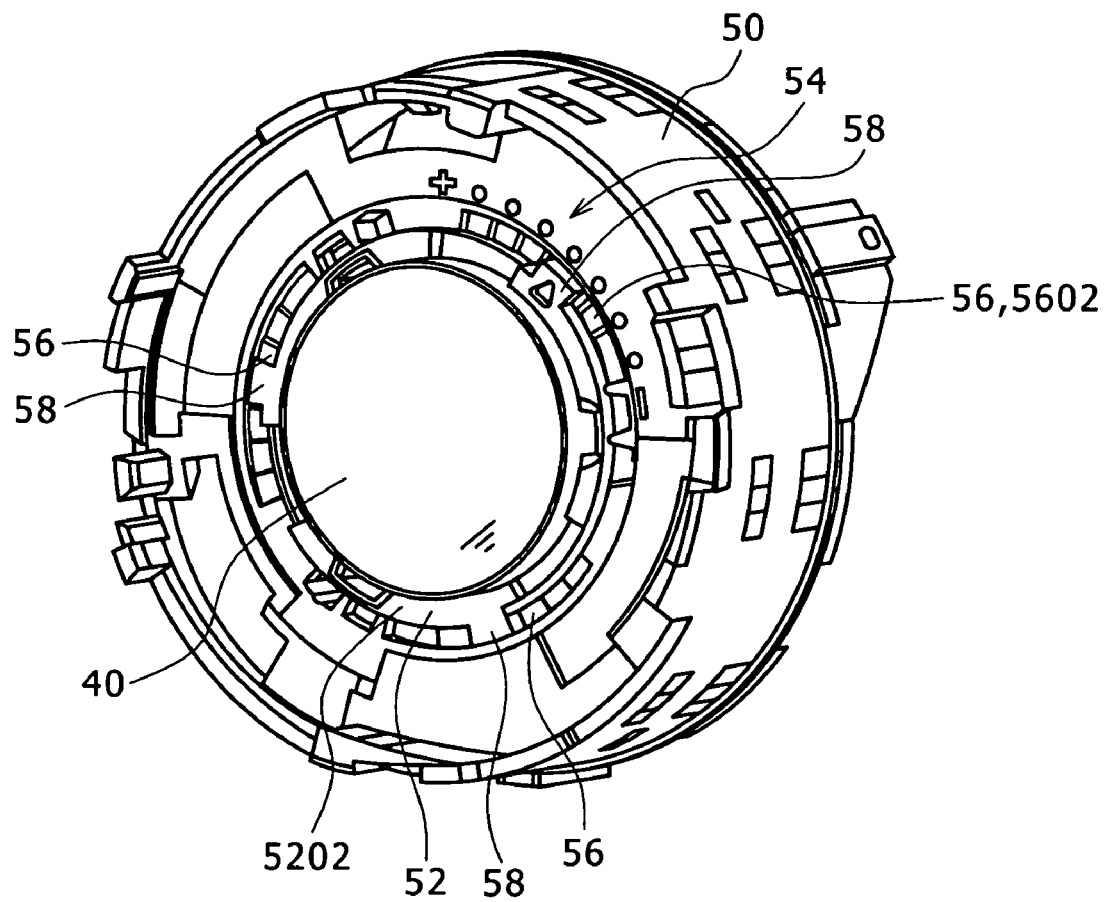
FIG. 5 is a perspective view illustrating a back focus adjustment lens group 40, a second barrel 50, and a back focus adjustment mechanism 54.

The back focus adjustment lens group 40 constitutes a part of the shooting optical system 14. The back focus adjustment lens group 40 is fixed immovably, after the position thereof in the direction of the optical axis L of the shooting optical system 14 is adjusted by a back focus adjustment mechanism 54 (FIG. 5).

Inside of the first barrel 48 and behind the back focus adjustment lens group 40, the intermediate lens group 42 and the focus lens group 44 are arranged from the front toward the back in this order.

The focus lens group 44 is moved in the direction of the optical axis L of the shooting optical system 14 by the lens moving mechanism (not shown) which operates by the control of the driver 38 described above. By the movement of the focus lens group 44, the focus adjustment of a subject image formed by the shooting optical system 14 on the image pickup plane 30A of the image sensor 30 is performed.

Namely, the shooting optical system 14 has the back focus adjustment lens group 40 arranged in the part nearest to the subject, the intermediate lens group 42 arranged between the back focus adjustment lens group 40 and the image sensor 30, and the focus lens group 44 arranged between the intermediate lens group 42 and the image sensor 30.

The Image sensor 30 is attached to the opening 48C of the back wall 48A. Between the focus lens group 44 and the image sensor 30, an optical filter 46 of a well known type, such as an infrared cut filter, is arranged.

Next, the back focus adjustment mechanism 54 which is the principal part of the present invention is explained.

Figure 4:
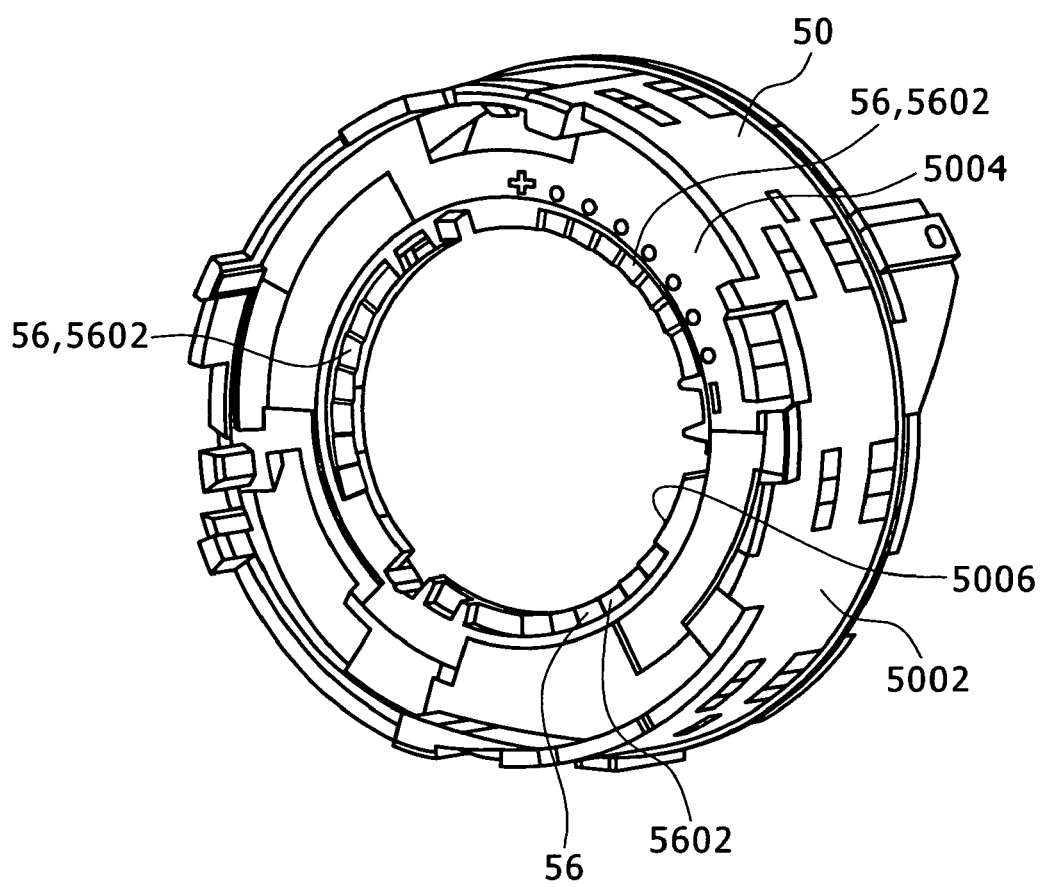
FIG. 4 is a perspective view looking at a second barrel 50 from the front.

FIG. 4 is a perspective view looking at a second barrel 50 from the front. FIG. 5 is a perspective view illustrating the back focus adjustment lens group 40, the second barrel 50, and the back focus adjustment mechanism 54. FIG. 6A is an explanatory chart of an engagement surface 5602 of a barrel engagement member 56; and FIG. 6B is an explanatory chart of the engagement surface of a comparative example.

In the present specification, the term "back focus adjustment" means the focus adjustment for adjusting the variation in the focus position induced in the shooting optical system 14 at the time of the manufacture/assembly of the shooting optical system 14 (lens barrel 16), but does not mean the focus adjustment for focusing a subject image on the image pickup plane 30A of the image sensor 30 at the time of photography.

The back focus adjustment mechanism 54 has the barrel engagement member 56 and a lens engagement member 58.

In the present embodiment, as illustrated in FIG. 4, the second barrel 50 possesses a cylinder 5002 centering on the optical axis L (FIG. 3), and a ring plate 5004 which is provided inside the cylinder 5002 with the axis same as the axis of the cylinder 5002 and which extends on a plane orthogonal to the optical axis L.

Inside the ring plate 5004, an opening 5006 is provided to form an optical path of the shooting optical system 14.

The barrel engagement member 56 is formed on the surface of the ring plate 5004 facing ahead.

In the present embodiment, three pieces of the barrel engagement members 56 are provided on the same circumference at the interval of 120 degrees in the circumferential direction.

Each piece of the barrel engagement members 56 possesses plural engagement surfaces 5602, each of which is arranged in the circumferential direction centering on the optical axis L, and each of which has a mutually different height in the direction parallel to the optical axis L.

In the present embodiment, each piece of the barrel engagement members 56 possesses seven pieces of engagement surfaces 5602, and three pieces of engagement surfaces 5602 which are located at the interval of 120 degrees among the three barrel engagement members 56 are formed to have the same height.

As illustrated in FIG. 6A, in each piece of the barrel engagement members 56, the plural engagement surfaces 5602 are formed so that the difference of height $\Delta h$ of adjacent engagement surfaces 5602 may increase or decrease along one of the circumferential directions.

As illustrated in FIG. 5, the lens holding frame 52 possesses a ring plate 5202 which extends along the outer circumference of the back focus adjustment lens group 40, and annularly along the part which is located radially inner than the barrel engagement members 56.

The lens engagement members 58 are formed protruding in the direction radially outward from the ring plate 5202 so that the lens engagement members 58 may engage with the barrel engagement members 56. In the present embodiment, three pieces of the lens engagement members 58 are provided at the interval of 120 degrees in the circumferential direction of the ring plate 5202.

As illustrated in FIG. 5 and FIG. 6A, each lens engagement members 58 is formed so as to selectively engage with the engagement surfaces 5602 of the barrel engagement members 56.

In the present embodiment, each of the lens engagement members 58 shares a common plane which extends orthogonally to the optical axis L. On this plane, the engagement with the engagement surfaces 5602 is made.

Consequently, positioning of the back focus adjustment lens group 40 in the direction of the optical axis L is accomplished by pressing three pieces of lens engagement members 58 of the lens holding frame 52 against the engagement surfaces 5602 of three barrel engagement members 56 of the second barrel 50, respectively. By changing the engagement surfaces 5602 against which the lens engagement members 58 are pressed, the back focus adjustment lens group 40 can be moved in the direction of the optical axis L by the difference of height $\Delta h$ of the adjoining engagement surfaces 5602.

That is, the position of the back focus adjustment lens group 40 in the direction of the optical axis L may be adjusted by the back focus adjustment mechanism 54.

In this way, in the present embodiment, the back focus adjustment lens group 40 is moved by the difference of height $\Delta h$ of the adjacent engagement surfaces 5602, by changing the engagement surface 5602 with which the lens engagement member 58 is currently engaged to the adjoining engagement surface 5602. When a back focus adjustment amount is defined by the movement amount that the image surface formed by the shooting optical system 14 moves in the optical axis direction, the difference of height Δh in the present embodiment is set up so that the back focus adjustment amount may become almost the same, even when the back focus adjustment lens group 40 is moved by the difference of height Δh of any pair of the adjoining engagement surfaces 5602.

In the present embodiment, when a focus sensitivity p of the back focus adjustment lens group 40 is defined by the ratio L2/L1, where L1 is a movement amount that the back focus adjustment lens group 40 moves in the direction of the optical axis L, and L2 is a movement amount that the image plane formed by the shooting optical system 14 moves in the optical axis direction, the focus sensitivity p increases or decreases when the back focus adjustment lens group 40 moves from one end to the other end in the optical axis direction. The difference of height Δh of the adjacent engagement surfaces 5602 is set up to the size corresponding to the amount of variation of the focus sensitivity p. In other words, the difference of height Δh of the adjacent engagement surfaces 5602 is set up to the size corresponding to the amount of variation of the focus sensitivity p such that the difference of height Δh becomes smaller in proportion to the increase of the focus sensitivity p and becomes greater in proportion to the decrease of the focus sensitivity p.

Positioning of the back focus adjustment lens group 40 in the direction of the optical axis L using the back focus adjustment mechanism 54 described above is accomplished as follows, for example.

By positioning the focus lens group 44 at the predetermined reference position in the direction of the optical axis L, a subject, which is positioned at the predetermined subject distance to the image pickup plane 30A of the image sensor 30, is rendered to provide its image on the image pickup plane 30A by the shooting optical system 14.

In this case, the focus position (a back focus or focusing position) of the shooting optical system 14 varies back and forth in the direction of the optical axis L centering on the predetermined design value, i.e., the reference value, due to a manufacturing error induced to a lens constituting the shooting optical system 14 and to a mechanical component holding the lens itself, or due to an assembly error induced at the time of assembling them.

Consequently, using the back focus adjustment mechanism 54, an adjustment is performed by moving the back focus adjustment lens group 40 by the difference of height Δh of the engagement surfaces 5602 in the direction of the optical axis L, so that the focus position of the shooting optical system 14 may be settled in the predetermined tolerance centering on the reference value (within the limits in which the focus adjustment is possible by the focus lens group 44).

When the back focus adjustment described above is completed, the lens holding frame 52 is fixed to the second barrel 50 with an adhesive material, keeping each lens engagement member 58 and each barrel engagement member 56 in the state of engagement. By the process, the back focus adjustment lens group 40 is fixed to the lens barrel 16 immovably.

Next, the operational effect of the lens barrel 16 according to the present embodiment is explained in comparison with a comparative example.

First, the focus sensitivity of the shooting optical system is explained.

FIG. 7 is an explanatory chart illustrating the relationship between the position X of the back focus adjustment lens group in the optical axis direction and the focus sensitivity p of the back focus adjustment lens group in the shooting optical system.

As mentioned above, the focus sensitivity p is defined by the value p=L2/L1, where L1 is the movement amount that the lens group which constitutes the shooting optical system of the lens barrel moves in the optical axis direction, and L2 is the movement amount of the image plane formed by the shooting optical system, corresponding to the movement amount L1.

Symbol A of FIG. 7 indicates the property of a shooting optical system of a comparative example which exhibits a small amount of variation (amount of fluctuation) of the focus sensitivity p of a back focus adjustment lens group to the change of the position X of the back focus adjustment lens group.

Symbol B of FIG. 7 indicates the property of a shooting optical system of another comparative example which exhibits some extent of an amount of variation (amount of fluctuation) of the focus sensitivity p of a back focus adjustment lens group, to the change of position X of the back focus adjustment lens group, but which allows a little movement amount for the position X of the back focus adjustment lens group.

Symbol C of FIG. 7 indicates the property of a shooting optical system with a large amount of variation (amount of fluctuation) of the focus sensitivity p of a back focus adjustment lens group to the change of the position X of the back focus adjustment lens group. This shooting optical system corresponds to the shooting optical system 14 of the present embodiment.

If it is assumed that the movable range of a back focus adjustment lens group is from −T to T, the focus sensitivity (longitudinal magnification) of the back focus adjustment lens group is p, and the focus sensitivity of the focus lens group is pf, then the maximum compensable range of the focus fluctuation can be roughly estimated to be ±(T×p/pf).

Next, the back focus adjustment in the comparative example is explained.

Figure 8A:
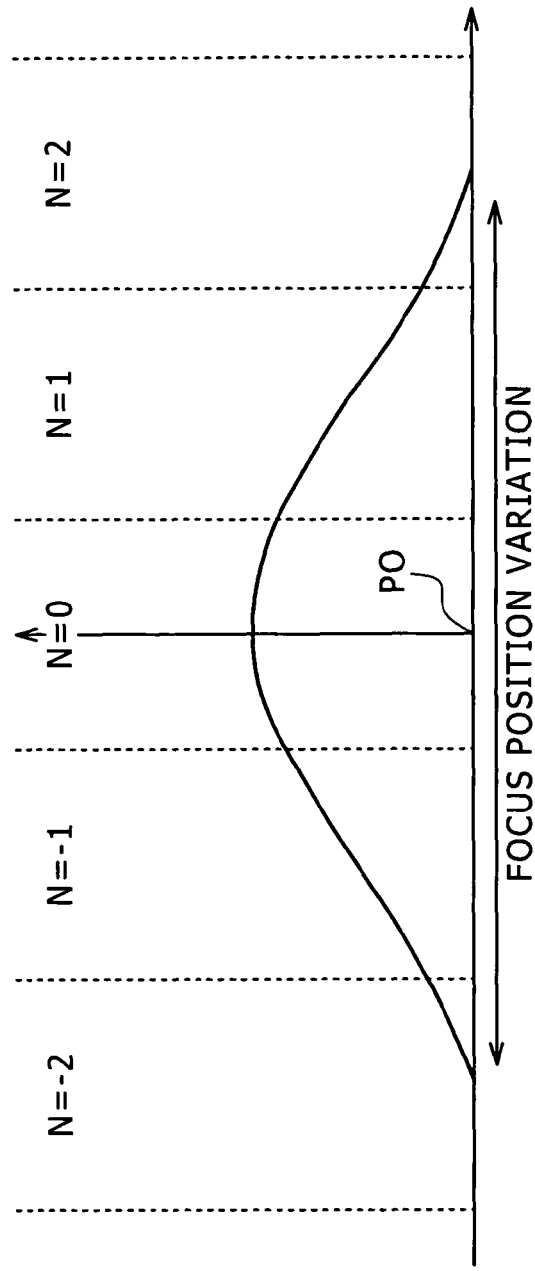
FIG. 8A is a schematic diagram illustrating the variation in the focus position (back focus) in the shooting optical system generated at the time of manufacture of the lens barrel in a comparative example.
Figure 8B:
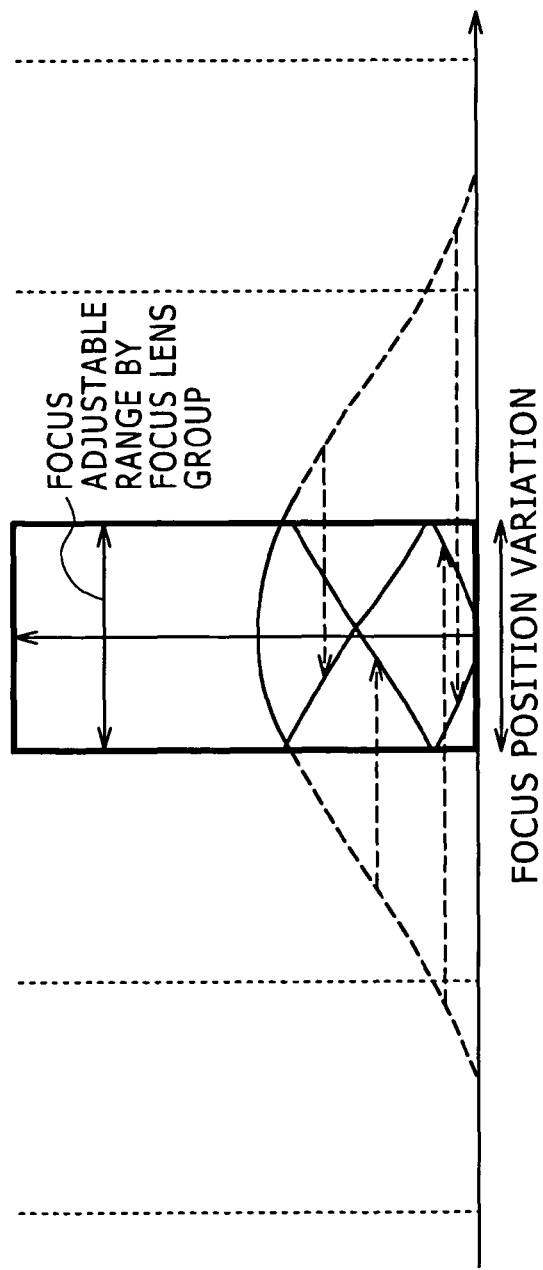
FIG. 8B is a schematic diagram illustrating the span of adjustable range after a back focus adjustment is practiced.

FIG. 8A is a schematic diagram illustrating the variation in the focus position (back focus) of the shooting optical system generated at the time of manufacture of the lens barrel in the comparative example. FIG. 8B is a schematic diagram illustrating the span of adjustable range after a back focus adjustment is practiced. In FIG. 8A and FIG. 8B, the horizontal axis indicates the focus position and the vertical axis indicates the number of the manufactured lens barrel.

As shown in FIG. 8A, when manufacturing a lens barrel, the focus position (back focus) of the shooting optical system incorporated in the lens barrel varies back and forth in the optical axis direction of the shooting optical system, centering on the optical design value P0 (reference value) due to the manufacturing error induced to a lens ball or a mechanical component.

Assuming that a range N=0 centering on the optical design value P0 is a range in which the focus adjustment is possible by moving the focus lens group, it is necessary to put back the variation in the range (N=−2, −1, 1, 2), which departs back and forth from the range N=0 at the center in the optical axis direction, to the range N=0 centering on the optical design value P0 by performing the back focus adjustment.

In the example of FIG. 8A, the five ranges (N=−2, −1, 0, 1, 2) of the variation in the focus position possess the variation in an equal size mutually.

When adjusting the back focus adjustment lens group in the direction of the optical axis L in the unit of the distance corresponding to the range N by employing the back focus adjustment mechanism, it becomes possible to put back the variation in the range (N=−2, −1, 1, 2), which departs from the center range N=0 back and forth in the optical axis direction, into the range N=0 centering on the optical design value PO, as shown in FIG. 8B.

If the property of the shooting optical system in the comparative example exhibits few amounts of variation (amounts of fluctuation) of the focus sensitivity p of the back focus adjustment lens group to the change of position X of the back focus adjustment lens group, as shown by Symbol A of FIG. 7, the amount of displacement of the back focus adjustment lens group necessary to adjust one range of the range N of the variation of the focus position of the shooting optical system may be the same, irrespective of the position of the back focus adjustment lens group in the optical axis direction.

That is, as shown in FIG. 6B, in the comparative example, the difference of height $\Delta h$ of the adjoining engagement surfaces 5602' of the barrel engagement member 56' which corresponds to the range N is the same, irrespective of the position of the back focus adjustment lens group in the optical axis direction.

By changing one by one the engagement surface 5602' of the barrel engagement member 56' with which the lens engagement member 58 engages, the back focus adjustment lens group is displaced by $\Delta h$ in the optical axis direction, and as shown by the arrows in FIG. 8B, the variation of the shooting optical system in ranges N=−2, −1, 1 and 2, which depart from the center range N=0, can be adjusted in the unit of range N, corresponding to the displacement of the back focus adjustment lens group in the unit of $\Delta h$.

Next, in connection with the back focus adjustment, an inconvenience encountered by the comparative example is explained.

In the lens barrel of the comparative example mentioned above, when a high refractive power is employed for each lens group which constitutes the shooting optical system in order to attain miniaturization and high magnification, the focus sensitivity p increases or decreases as the back focus adjustment lens group 40 moves from one end to the other end in the optical axis direction, as shown by Symbol C of FIG. 7. In addition, the amount of variation (amount of fluctuation) of the focus sensitivity p of the back focus adjustment lens group becomes large in relation to the change of position X of the back focus adjustment lens group. Accordingly, if the amount of displacement of the back focus adjustment lens group in the optical axis direction is made the same, irrespective of the position of the back focus adjustment lens group in the optical axis direction, as in the comparative example mentioned above, the following inconvenience will be encountered.

FIG. 9A is a schematic diagram illustrating the variation in the focus position (back focus) generated at the time of manufacture of a lens barrel, when the refractive power of each lens group is high. FIG. 9B is a schematic diagram illustrating the span of adjustable range after a back focus adjustment is practiced. In FIG. 9A and FIG. 9B, the horizontal axis indicates the focus position and the vertical axis indicates the number of the manufactured lens barrel.

As illustrated in FIG. 9A, the focus position (back focus) of the shooting optical system varies centering on the optical design value PO, similarly to the case of FIG. 8A.

Here, the case is discussed where the difference of height $\Delta h$ of the adjoining engagement surfaces 5602' of the barrel engagement member 56' corresponding to the range N is set the same, irrespective of the position of the back focus adjustment lens group in the optical axis direction, as illustrated in FIG. 6B.

In this case, by changing one by one the engagement surface 5602' of the barrel engagement member 56' with which the lens engagement member 58 engages, the back focus adjustment lens group is displaced by $\Delta h$ in the optical axis direction. Corresponding to the displacement of the back focus adjustment lens group in the unit of $\Delta h$, it is possible to adjust the variation of the shooting optical system in the ranges N=−2, −1, 1 and 2, which depart from the center range N=0, in the unit of range N, as illustrated in FIG. 9B by the arrows.

However, as shown by Symbol C of FIG. 7, the amount of variation (amount of fluctuation) of the focus sensitivity p of the back focus adjustment lens group is large relative to the change of position X of the back focus adjustment lens group. Therefore, when the back focus adjustment lens group is displaced in the unit of $\Delta h$ of identical size, the size of the range N will change according to the position X of the back focus adjustment lens group, as illustrated in FIG. 9B.

In the example of FIG. 9B for example, it is assumed that the range N=−2 is a range of variation in the focus position nearest to the image pickup plane 30A, and the range N=2 is a range of variation in the focus position farthest from the image pickup plane 30A (nearest to the subject). As the range N is more spaced from the image pickup plane 30A, the size of the range N (magnitude of variation) tends to become larger gradually.

Depending on the structure of the shooting optical system, as the range N is more spaced from the image pickup plane 30A, the size of the range N may conversely become smaller gradually.

In other words, when the difference of height $\Delta h$ of the adjoining engagement surfaces 5602' of the barrel engagement member 56' with which the lens engagement member 58 is engaged is set to be uniform, the size of the back focus adjustable range corresponding to each of $\Delta h$ will not be uniform.

Consequently, as illustrated by the arrows in FIG. 9B, it becomes necessary to set the focus adjustment range of the focus lens group to the size corresponding to the range N=2 where the variation is largest.

Namely, when the back focus adjustment is carried out by $\Delta h$ of identical size, as in the present comparative example, it is possible to decrease the variation of the focus position of the shooting optical system which corresponds to the range N=−2, −1, 1 and 2, as illustrated in FIG. 9B by the arrows. However, the range of the final focus fluctuation will depend on the largest back focus adjustable range.

In other words, as illustrated in FIG. 9B, the range of the final focus fluctuation is regulated by the back focus adjustable range in the range N=2, and on the other hand, the back focus adjustable range becomes small in the range N=−2.

Therefore, in order that the focus lens group absorbs, by the focus adjustment thereof, the variation of the focus position of the shooting optical system corresponding to the difference between the back focus adjustable range of the range N=2 and the back focus adjustable range of the range N=−2, it becomes necessary to secure a sufficient range of movement of the focus lens group in the optical axis direction. Consequently, there arises an inconvenience that the difference described above becomes a useless adjustable range as the back focus adjustable range.

On the other hand, as shown by Symbol B of FIG. 7, even if there is some extent of an amount of variation (amount of fluctuation) of the focus sensitivity p of the back focus adjustment lens group to the change of position X of the back focus adjustment lens group, when the range of variation of the focus position of the shooting optical system is small from the first and when it is possible to perform the back focus adjustment without moving the position of the back focus adjustment lens group considerably, a small amount of displacement of the back focus adjustment lens group may be sufficient.

Consequently, in this case, even if the range of the final focus fluctuation is dependent on the largest back focus adjustable range, the inconvenience explained above with reference to FIG. 9B can be disregarded.

Therefore, in attaining an increase in efficiency of the back focus adjustment, one embodiment of the present invention aims to suppress the uselessness of the back focus adjustable range that may be produced, as shown by Symbol C of FIG. 7, when the amount of variation (amount of fluctuation) of the focus sensitivity p of the back focus adjustment lens group is large relative to the change of position X of the back focus adjustment lens group, and when the variation in the focus position of the shooting optical system is comparatively large.

Next, the operational effect of the present embodiment is explained.

In the lens barrel 16 of the present embodiment, as shown in FIG. 6A, the plural engagement surfaces 5602 of the barrel engagement member 56 of the back focus adjustment mechanism 54 are formed so that the difference of height $\Delta h$ of the adjacent engagement surfaces 5602 may increase or decrease along with one of the circumferential directions. By this scheme, the difference of height $\Delta h$ is set up so as to make the back focus adjustment amount become almost the same, even when the back focus adjustment lens group 40 is moved by any one of the differences of height $\Delta h$ (that is, by the difference of height $\Delta h$ of any pair of the adjoining engagement surfaces 5602).

Consequently, it is possible to make the back focus adjustable range to be adjusted by changing one by one the engagement surface 5602 of the barrel engagement member 56, with which the lens engagement member 58 of the back focus adjustment mechanism 54 is engaged, the same. In the same manner as in the case shown in FIG. 8B, when the back focus adjustment lens group 40 is adjusted in the direction of the optical axis L in the unit of the distance corresponding to the range N, it becomes possible to put back the variation in the range (N=−2, −1, 1, 2), which departs from the center range N=0 back and forth in the optical axis direction, into the range N=0 centering on the optical design value PO, as shown in FIG. 8B. This fact results in an advantage of performing the back focus adjustment appropriately and efficiently with a suppression of the uselessness of the back focus adjustable range.

This fact also leads to an advantage in attaining the miniaturization of the shooting optical system 14 and the lens barrel 16, by increasing the refractive index of the lens group which constitutes the shooting optical system 14, because the range of movement of the focus lens group 44 is reducible owing to the suppression of the uselessness of the back focus adjustable range.

Since the focus sensitivity p changes due to the movement of the back focus adjustment lens group 40 in the direction of the optical axis L, the back focus adjustable range, which is necessary in order to adjust the variation in the focus position of the shooting optical system, changes depending on the position in the optical axis direction.

Figure 10:
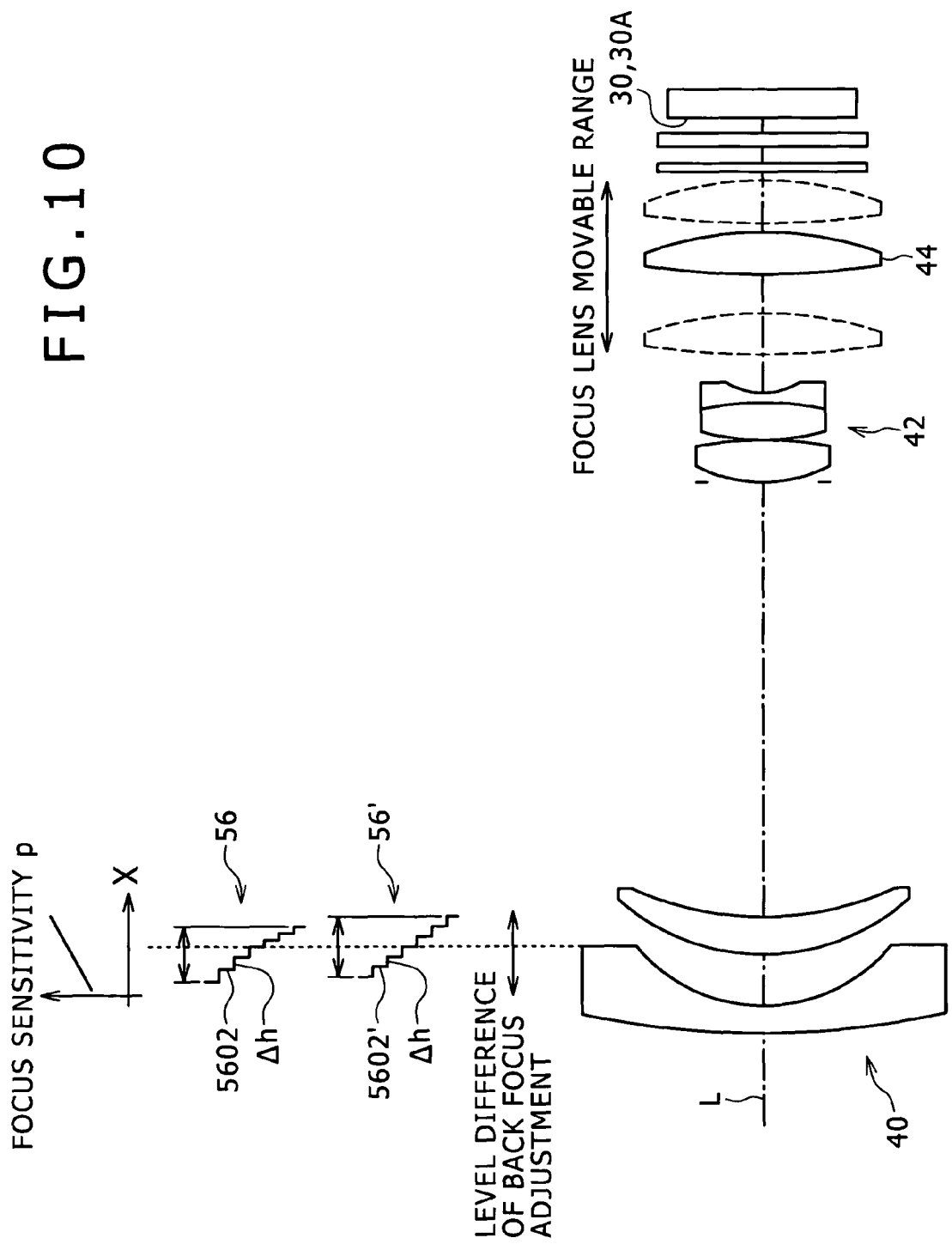
FIG. 10 is an explanatory view illustrating the difference between the lens barrel of the present embodiment and the lens barrel of a comparative example.

When the reference position of the engagement surface of the back focus adjustment lens group in the optical axis direction is determined in optical design and is defined as a design position, the comparative example suffers an inconvenience that the width of each back focus adjustable range (width of variation) centering on the optical design value PO becomes asymmetric as shown in FIG. 9B, since in the comparative example, the difference of height $\Delta h$ of the adjoining engagement surfaces 5602' of the barrel engagement member 56' is set the same as shown in FIG. 10.

According to the present embodiment, on the other hand, by forming the engagement surface 5602 such that the difference of height $\Delta h$ of the adjoining engagement surfaces 5602 of the barrel engagement member 56 may increase or decrease along with one of the circumferential directions as shown in FIG. 10, and such that the difference of height £h among the engagement surfaces 5602 may become asymmetric in the direction of the optical axis L with respect to a design position as a center, the width of the back focus adjustable range can be made symmetrical in the vicinity of the optical design value PO as a center in the optical axis direction, as shown in FIG. 6B. Here, the design position is defined by the position of the engagement surface 5602 determined in the optical design in the optical axis direction, including neither the processing error nor the assembly error (in other words, the design position is defined by the position of the engagement surface 5602 in the direction of the optical axis L, with which the lens engagement member 58 should be engaged in the state where the focus position of the shooting optical system 14 agrees with the focus position determined in the optical design in the optical axis direction, including neither the processing error nor the assembly error).

In the present embodiment, a so-called minus-plus-plus optical system is constructed, where the back focus adjustment lens group 40 possesses a negative refractive power, the intermediate lens group 42 possesses a positive refractive power, the focus lens group 44 possesses a positive refractive power, the focus lens group 44 performs focusing, and the back focus adjustment lens group 40 performs the back focus adjustment.

Since the minus-plus-plus optical system has a low focus sensitivity of the focusing group, it may be necessary to secure a large span of adjustable range for the focusing group to compensate for the processing error or the assembly error. However, the present minus-plus-plus optical system possesses the back focus adjustment lens group proposed by the present invention, and the movable range of the focusing group can be reduced by making the span of adjustable range $\Delta h$ in the optical axis direction variable. Consequently, the present minus-plus-plus optical system can perform the most effective compensation in attaining miniaturization.

In the present embodiment, the case is explained where the back focus adjustment lens group 40 among the lens groups of the shooting optical systems 14 is arranged in the position nearest to the subject in the direction of the optical axis L. However, the back focus adjustment lens group 40 may be arranged in an arbitrarily position in the direction of the optical axis L.

However, when the back focus adjustment lens group 40 is arranged in the position nearest to the subject, as in the present embodiment, the back focus adjustment mechanism 54 can be simplified and the back focus adjustment work can be advantageously and simply performed, as compared with the case where the back focus adjustment lens group 40 is arranged in the mid-position of plural lens groups which constitute the shooting optical system 14.

In the present embodiment, the case is explained where the shooting optical system 14 includes three lens groups: the back focus adjustment lens group 40; the intermediate lens group 42; and the focus lens group 44. However, the lens group of the shooting optical system 14 may be constructed arbitrarily.

In the present embodiment, although the digital still camera is illustrated as an image pickup apparatus, it is needless to say that the present invention is applicable to various image pickup apparatuses, such as a video camera and a television camera.

It should be understood by those skilled in the art that various modifications, combinations, subcombinations and alterations may occur depending on design requirements and other factors insofar as they are within the scope of the appended claims or the equivalents thereof.

What is claimed is:

1. A lens barrel comprising:
a shooting optical system contained in a barrel, the shooting optical system being operable to lead a subject image to an image sensor, the shooting optical system;
a back focus adjustment lens group constituting a part of the shooting optical system and operable to be fixed immovably after the position of the back focus adjustment lens group is adjusted in an optical axis direction of the shooting optical system; and
a back focus adjustment mechanism operable to adjust the position of the back focus adjustment lens group in the optical axis direction of the back focus adjustment lens group,
wherein the back focus adjustment mechanism includes
a barrel engagement member possessing a plurality of engagement surfaces arranged in the barrel in a circumferential direction centering on the optical axis, each of the plurality of engagement surfaces possessing a different height in a direction parallel with the optical axis, and
a lens engagement member arranged in a lens holding frame which holds the back focus adjustment lens group, the lens engagement member being operable to be selectively engaged with the engagement surfaces,
wherein the back focus adjustment lens group is adjusted in position in the optical axis direction by changing the engagement surfaces with which the lens engagement member is engaged, and
wherein the adjoining engagement surfaces are formed to possess one of increasing difference in height and decreasing difference in height along the circumferential direction.

2. The lens barrel of claim 1,
wherein a back focus adjustment amount is defined by a movement amount that an image plane formed in the shooting optical system moves in the optical axis direction, as a result that the back focus adjustment lens group is moved by the difference of height of the adjoining engagement surfaces by shifting the engagement surface with which the lens engagement member is engaged to the adjoining engagement surface, and
wherein the difference of height is set up so as to make the back focus adjustment amount become substantially the same when the back focus adjustment lens group is moved by the difference of height of any pair of the adjoining engagement surfaces.

3. The lens barrel of claim 1,
wherein focus sensitivity of the back focus adjustment lens group is defined by a ratio L2/L1, where L1 is a movement amount that the back focus adjustment lens group moves in the optical axis direction and L2 is a movement amount that an image plane formed in the shooting optical system moves in the optical axis direction, and
wherein the focus sensitivity exhibits one of increasing change and decreasing change, when the back focus adjustment lens group moves from one end to the other end in the optical axis direction.

4. The lens barrel of claim 1,
wherein a design position of the engagement surface is defined by a position of the engagement surface in the optical axis, the position of the engagement surface being determined in terms of optical design excluding processing error and assembly error, and
wherein the adjoining engagement surfaces are formed to possess the difference of height asymmetrical with respect to the design position in the optical axis direction.

5. The lens barrel of claim 1, wherein the back focus adjustment lens group is arranged at a position nearest to a subject in the shooting optical system.

6. The lens barrel of claim 1, wherein the shooting optical system possesses:
a focus lens group which is arranged between the back focus adjustment lens group and the image sensor and is movable in the optical axis direction.

7. The lens barrel of claim 1, wherein the shooting optical system possesses:
an intermediate lens group which is arranged between the back focus adjustment lens group and the image sensor; and
a focus lens group which is arranged between the intermediate lens group and the image sensor and is movable in the optical axis direction.

8. The lens barrel of claim 1,
wherein the shooting optical system possesses:
an intermediate lens group which is arranged between the back focus adjustment lens group and the image sensor; and
a focus lens group which is arranged between the intermediate lens group and the image sensor and is movable in the optical axis direction, and
wherein the back focus adjustment lens group is arranged at a position nearest to a subject in the shooting optical system.

9. The lens barrel of claim 1,
wherein the shooting optical system possesses:
an intermediate lens group which is arranged between the back focus adjustment lens group and the image sensor; and
a focus lens group which is arranged between the intermediate lens group and the image sensor and is movable in the optical axis direction,
wherein the back focus adjustment lens group possesses a minus refractive power,
wherein the intermediate lens group possesses a plus refractive power, and
wherein the focus lens group possesses a plus refractive power.

10. The lens barrel of claim 1,
wherein the back focus adjustment mechanism includes a plurality of the lens engagement members arranged in the lens holding frame, the lens engagement members sharing a common plane that extends orthogonally to the optical axis, the lens engagement members being operable to be selectively engaged with the engagement surfaces on the common plane.

11. An image pickup apparatus comprising:
a lens barrel,
wherein the lens barrel includes
a shooting optical system contained in a barrel, the shooting optical system being operable to lead a subject image to an image sensor,
a back focus adjustment lens group constituting a part of the shooting optical system and operable to be fixed immovably after the position of the back focus adjustment lens group is adjusted in an optical axis direction of the shooting optical system, and a back focus adjustment mechanism operable to adjust the position of the back focus adjustment lens group in the optical axis direction, wherein the back focus adjustment mechanism includes a barrel engagement member possessing a plurality of engagement surfaces arranged in the barrel in a circumferential direction centering on the optical axis, each of the plurality of engagement surfaces possessing a different height in a direction parallel with the optical axis, and a lens engagement member arranged in a lens holding frame which holds the back focus adjustment lens group, the lens engagement member being operable to be selectively engaged with the engagement surfaces, wherein the back focus adjustment lens group is adjusted in position in the optical axis direction by changing the engagement surfaces with which the lens engagement member is engaged, and wherein the adjoining engagement surfaces are formed to possess one of increasing difference in height and decreasing difference in height along the circumferential direction.

* * * * *